(12) United States Patent
Lin

(10) Patent No.: US 11,572,217 B2
(45) Date of Patent: *Feb. 7, 2023

(54) SHIPPING AND DISPLAY CONTAINER

(71) Applicant: Dongguan Shichang Metals Factory Ltd., DongGuan (CN)

(72) Inventor: Chen-Kang Lin, DongGuan (CN)

(73) Assignee: Dongguan Shichang Metals Factory Ltd., DongGuan (CN)

( * ) Notice: Subject to any disclaimer, the term of this patent is extended or adjusted under 35 U.S.C. 154(b) by 22 days.

This patent is subject to a terminal disclaimer.

(21) Appl. No.: 17/362,090

(22) Filed: Jun. 29, 2021

(65) Prior Publication Data

US 2021/0323723 A1    Oct. 21, 2021

Related U.S. Application Data

(63) Continuation of application No. 16/748,099, filed on Jan. 21, 2020, now Pat. No. 11,077,984, which is a continuation of application No. 16/043,556, filed on Jul. 24, 2018, now Pat. No. 10,640,256, which is a continuation of application No. 29/645,159, filed on Apr. 24, 2018, now Pat. No. Des. 915,800.

(60) Provisional application No. 62/661,774, filed on Apr. 24, 2018.

(30) Foreign Application Priority Data

May 4, 2018    (CN) .......................... 201820667307.0
May 4, 2018    (CN) .......................... 201830197882.4

(51) Int. Cl.
*B65D 5/49*    (2006.01)

(52) U.S. Cl.
CPC .............................. *B65D 5/48024* (2013.01)

(58) Field of Classification Search
CPC .......... B65D 5/48024; B65D 2585/648; A47F 7/0028; A47F 5/005; A47F 5/0018; A47F 3/142; A47F 7/30; B62B 2202/32
USPC .......................... 206/748, 750, 756; 220/653
See application file for complete search history.

(56) References Cited

U.S. PATENT DOCUMENTS

| 1,865,618 | A | * | 7/1932 | Dahlman | ............... | A47B 83/02 |
| | | | | | | 312/289 |
| 3,028,197 | A | * | 4/1962 | Wilson | ................... | A47C 11/02 |
| | | | | | | 297/239 |
| 3,346,107 | A | * | 10/1967 | Nederveld | ............. | B65D 85/62 |
| | | | | | | 206/326 |
| 10,640,256 | B2 | * | 5/2020 | Lin | ....................... | A47F 5/0018 |

(Continued)

*Primary Examiner* — J. Gregory Pickett
*Assistant Examiner* — Jenine Pagan
(74) *Attorney, Agent, or Firm* — Luedeka Neely Group, PC

(57)    ABSTRACT

A shipping and display container includes a top box installable over a bottom box. The bottom box is configured to receive goods provided in the bottom box in an upright and folded orientation and includes a pair of opposed sidewalls and at least one elongate divider affixed to the bottom box and extending between the opposed sidewalls and configured so as to maintain the goods in the upright and folded orientation. The top box is installable upon the bottom box with the goods received therein in the upright and folded orientation for shipping of the goods and is removable from the bottom box after shipping. The bottom box and the divider cooperate to maintain the goods in the upright and folded orientation for display thereof after removal of the top box.

16 Claims, 5 Drawing Sheets

(56) References Cited

U.S. PATENT DOCUMENTS

| | | | |
|---|---|---|---|
| 11,077,984 B2* | 8/2021 | Lin ..................... | A47F 5/0018 |
| 2004/0069665 A1* | 4/2004 | Tsai .................... | B65D 57/005 |
| | | | 206/326 |
| 2011/0012392 A1* | 1/2011 | Herschler ............. | A47B 83/02 |
| | | | 297/139 |

* cited by examiner

SHIPPING AND DISPLAY CONTAINER

CROSS-REFERENCE TO RELATED APPLICATION

This application claims priority to U.S. Provisional Application No. 62/661,774 filed Apr. 24, 2018, entitled SHIPPING AND DISPLAY CONTAINER, US Design Application No. 29/645,159 filed Apr. 24, 2018, entitled SHIPPING AND DISPLAY CONTAINER, Chinese utility model application Serial No. 2018206673070 filed on May 4, 2018, entitled SHIPPING AND DISPLAY CONTAINER, and Chinese Design application Serial No. 2018301978824 filed on May 4, 2018, entitled SHIPPING AND DISPLAY CONTAINER, each incorporated herein by reference in its entirety.

FIELD

This disclosure relates to the field of shipping and display containers. More particularly, this disclosure relates to a shipping and display containers of improved function and simplified construction, and particularly configured for use with furniture items such as folding chairs.

BACKGROUND

Improvement is desired in regards to containers for shipping furniture such as folding chairs. In particular, what is desired is a shipping container that is also suitable for display of the items shipped in the container.

Conventionally, goods such as folding chairs are packed into a bottom box and the bottom box is covered with a top box secured by strapping or the like for shipping. The chairs are tightly packed in the bottom box and packaging foam or the like is located between the chairs.

Once delivered, the top box and the packaging foam are removed and the bottom box with the chairs is located at a store for display and sale. As chairs are sold, space develops between chairs in the bottom box. Often, chairs will fall over, become unfolded, and otherwise result in a cumbersome and unattractive display of the chairs. For example, some chairs may fall over and be difficult for a customer to see and select. Other chairs may lean and detract from the display.

Thus, what is desired is a shipping and display container that is configured to maintain the goods such as folding chairs in an upright and folded orientation as the goods are sold and avoid shortcomings of conventional containers.

SUMMARY

The above and other needs are met by a shipping and display container.

In one aspect, the shipping and display container includes a bottom box configured to receive foldable goods in an upright and folded orientation. The bottom box has a pair of opposed sidewalls, and at least one elongate divider affixed to the bottom box and extending between the opposed sidewalls and configured so as to enable to maintain the goods in the upright and folded orientation.

A top box is installable upon the bottom box with the goods received therein in the upright and folded orientation for shipping of the goods, the top box removable from the bottom box after shipping. The bottom box and the divider cooperate to maintain the goods in the upright and folded orientation for display thereof after removal of the top box.

In another aspect, a shipping and display container includes a bottom rectangular box configured to receive folding chairs in an upright and folded orientation. The bottom box has a pair of opposed sidewalls, and a plurality of uniformly spaced apart elongate elastic dividers affixed to the bottom box and extending substantially parallel to one another between upper portions of the opposed sidewalls and configured so as to maintain the chairs in the upright and folded orientation.

A top box is installable upon the bottom box with the chairs received therein in the upright and folded orientation for shipping of the chairs, the top box removable from the bottom box after shipping. The bottom box and the elongate elastic dividers cooperate to maintain the chairs in the upright and folded orientation for display thereof after removal of the top box.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
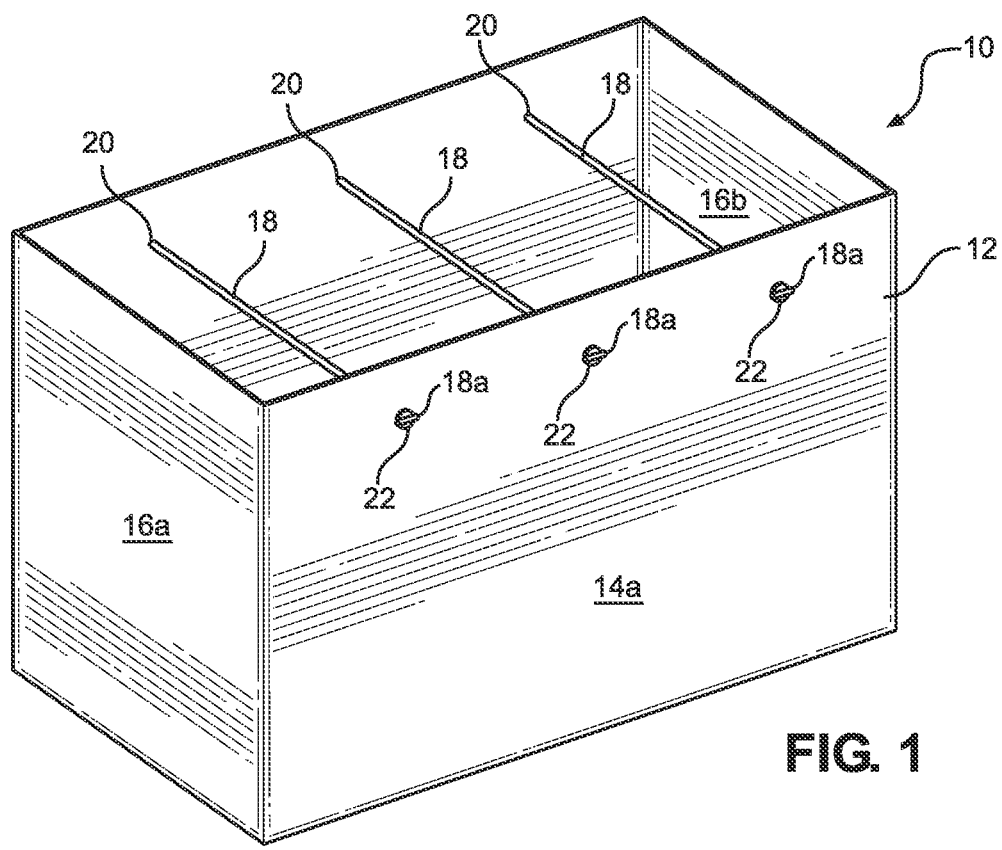
FIG. 1 is a perspective view of a shipping and display container according to the disclosure having a plurality of interior elastic divider straps.
Figure 2:
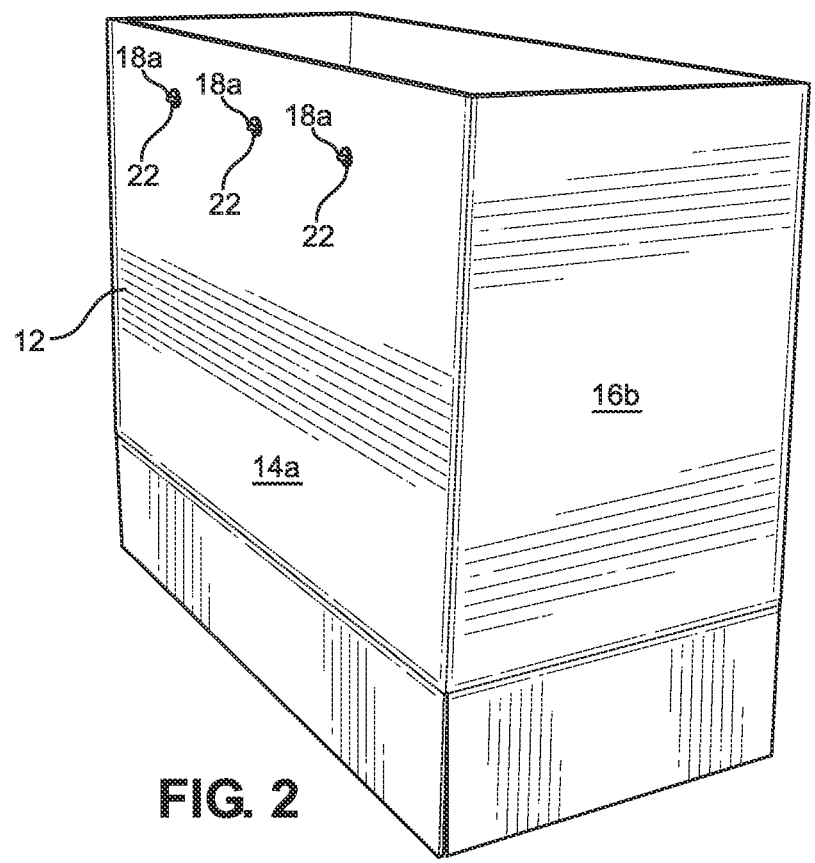
FIGS. 2 and 3 show a blank for forming the container.
Figure 3:
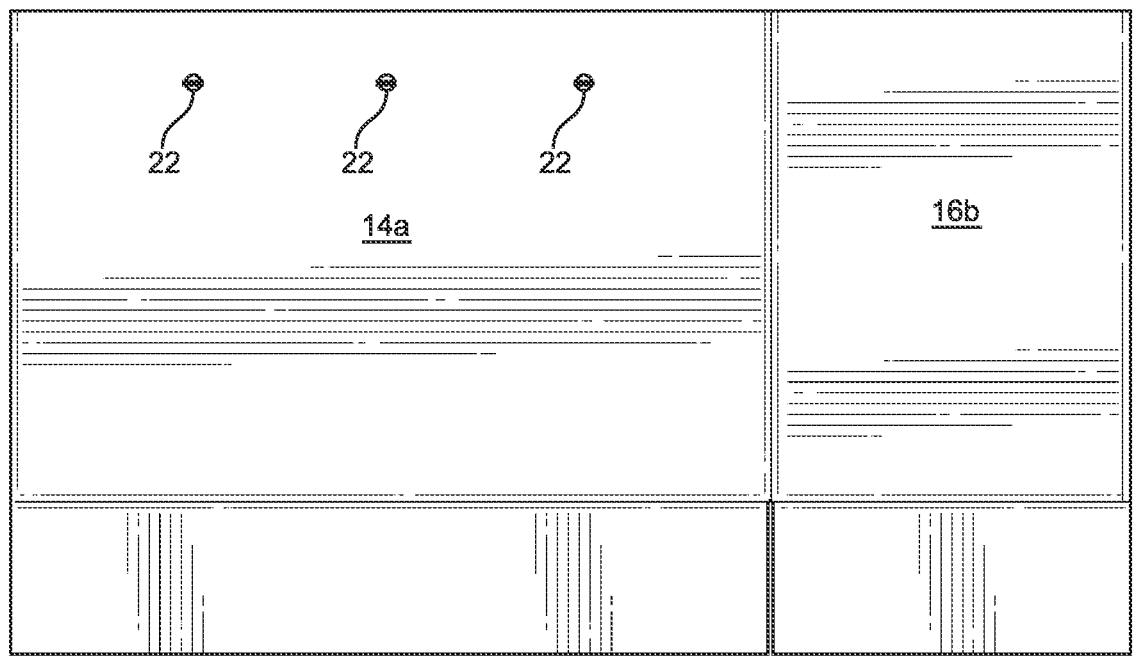
Figure 4:
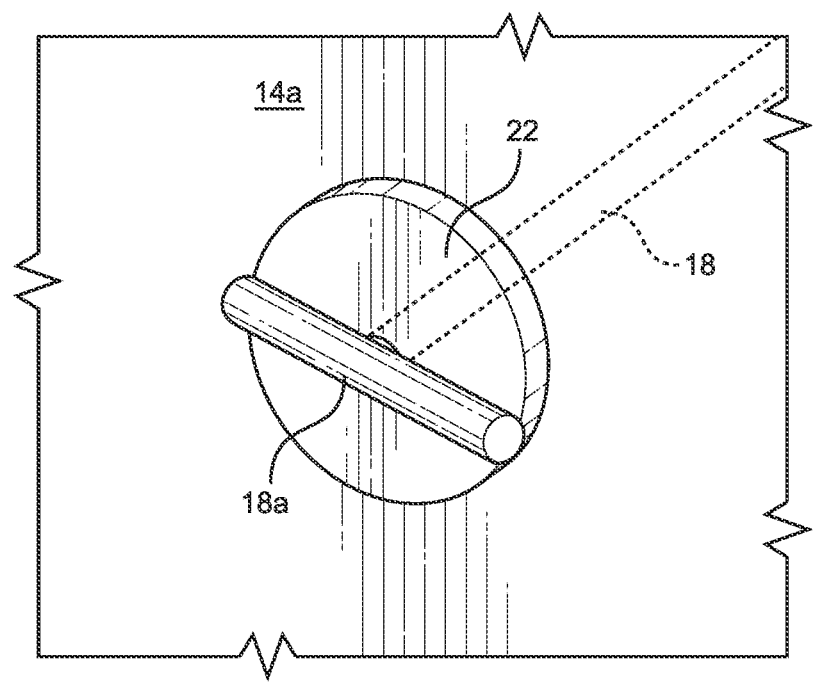
FIG. 4 is a closeup view of an exterior portion of the container of FIG. 1, showing an attachment point for an elastic divider strap to the container.

With initial reference to FIG. 1, there are shown a shipping and display container 10 according to the disclosure. The container 10 is shown herein configured for shipping and displaying folding chairs. It will be understood that the container 10 may be configured to ship and display other goods such as tables, benches, and other items having irregular shapes or otherwise configured so that they do not stand in an upright orientation without support.

The container 10 may be provided by a paperboard or like box 12 having a generally rectangular configuration with opposed sidewalls 14a and 14b and opposed end walls 16a and 16b. The container 10 includes a plurality of spaced apart elongate dividers 18 affixed between the sidewalls 14a and 14b. The elongate dividers 18 are desirably provided by elastic straps that are supported by and extend between the sidewalls 14a and 14b. The elongate dividers 18 may be supported by the sidewalls 14a and 14b in various ways.

In one example, ends 18a of the elongate dividers 18 are provided by plastic rods formed at the ends of the elongate dividers 18 to extend perpendicular to the length of the dividers 18. The ends 18a may be passed through apertures 20 formed through the sidewalls 14a and 14b and corresponding plastic mounts 22 located on the exterior and/or interior of the sidewalls 14a and 14b. The mounts 22 are optional but desirable to reinforce the portion of the sidewalls at the apertures 20. In this regard, the mounts 22, and hence the dividers 18, are preferably adjacent an upper end of the sidewalls 14a and 14b.

Figure 5:
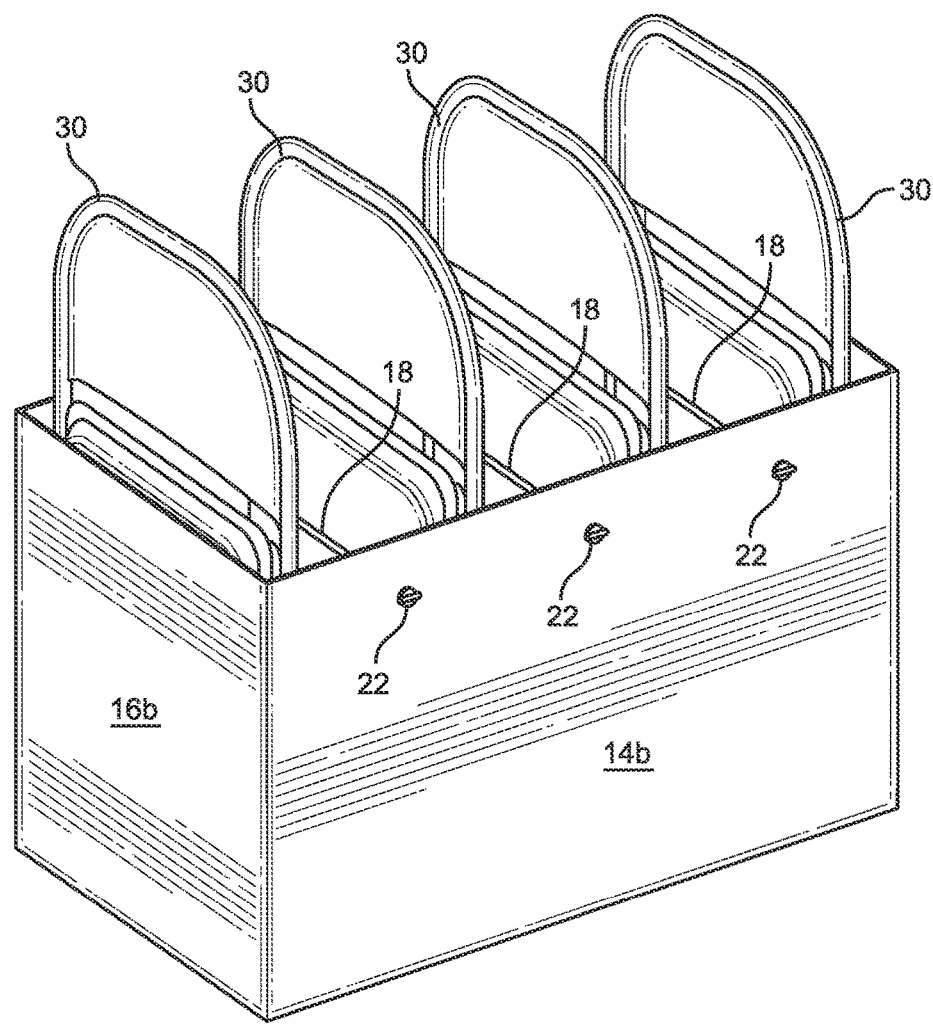
FIGS. 5-7 show the container of FIG. 1 containing chairs.
Figure 6:
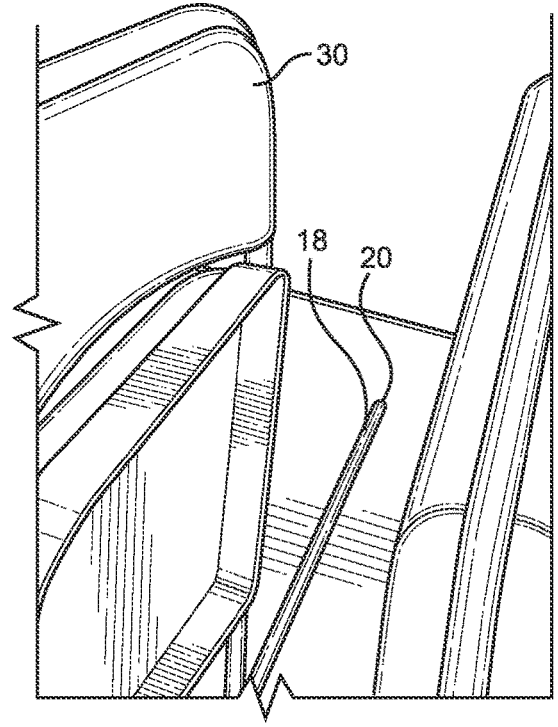
Figure 7:
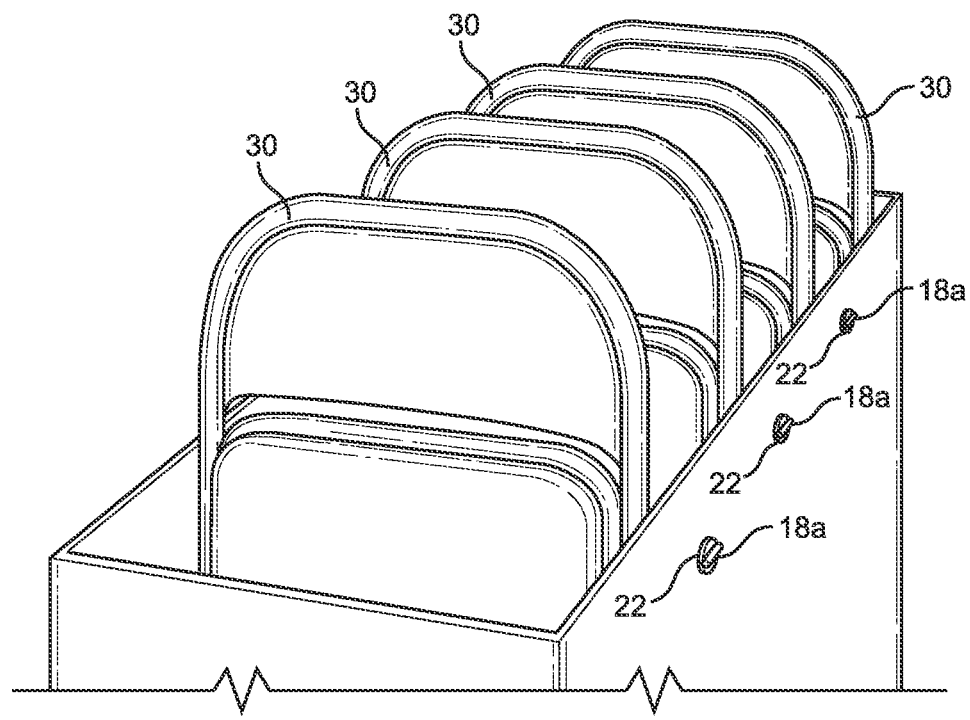

As shown in FIG. 5, the box 12 is configured to receive goods, such as folding chairs 30 in an upright, folded orientation. The chairs 30 are stacked in the box 12 and the dividers 18 extend between certain adjacent ones of the chairs 30. The purpose of the dividers 18 is to maintain the chairs 30 in a generally upright orientation while on display at a store or the like, even though some of the chairs 30 have been sold and the box 12 is not longer substantially full of the chairs 30. The box 12 is shown with only four (4) of the chairs 30 for simplicity. As described below, the depicted box 12 is configured to initially hold about twenty-three (23) or twenty-four (24) of the chairs 30.

It will be appreciated that absent the presence of the dividers 18, when the box 12 loses chairs 30 from the selling of chairs, the remaining chairs 30 are difficult to maintain in an upright orientation that is attractive for display. While any number of the dividers 18 may be provided, it has been observed that a preferred number of the dividers 18 is preferably about one-eighth the number of chairs. For example, for the box 12 configured to tightly pack twenty-three (23) or twenty-four (24) of the chairs, use of three (3) of the dividers 18 is preferred.

Figure 8:
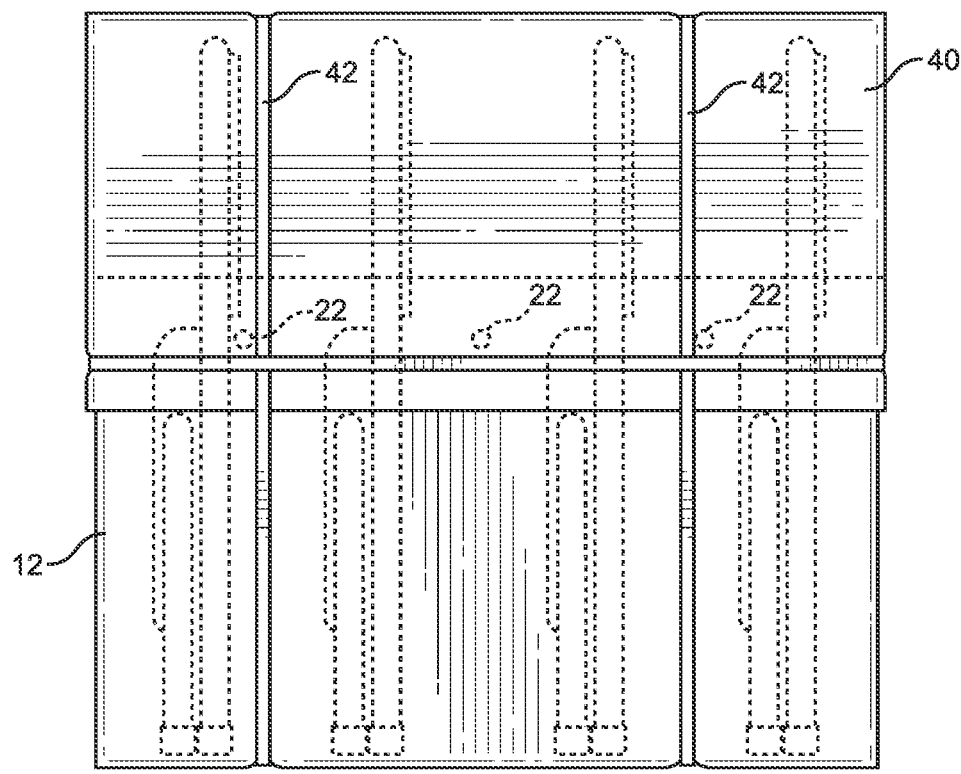
FIG. 8 shows the container of FIG. 1 with an additional top component and secured for shipping of the container loaded with chairs.
Figure 9:
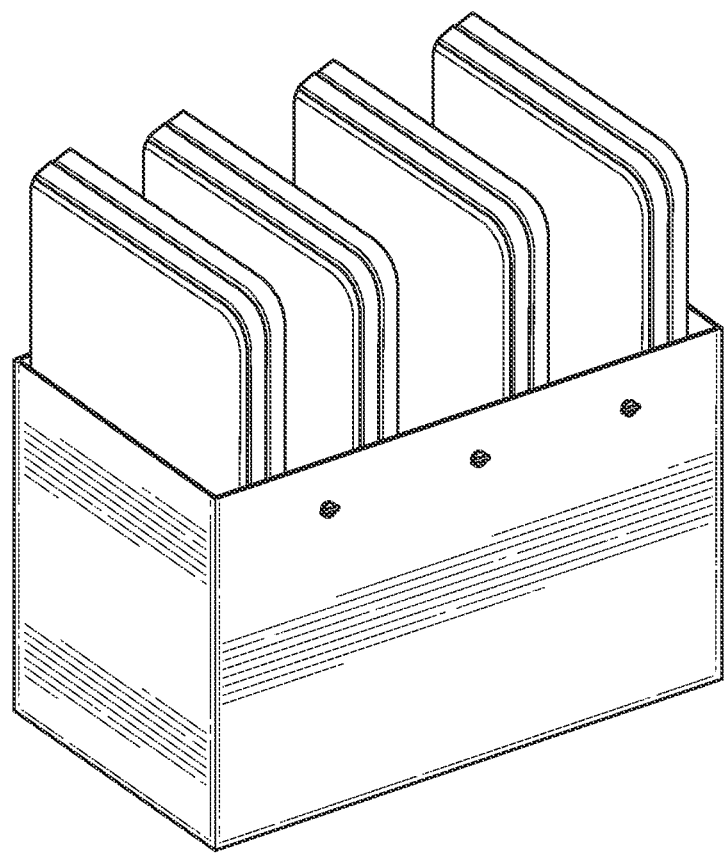
FIG. 9 shows the container of FIG. 1 loaded with foldable tables.
Figure 10:
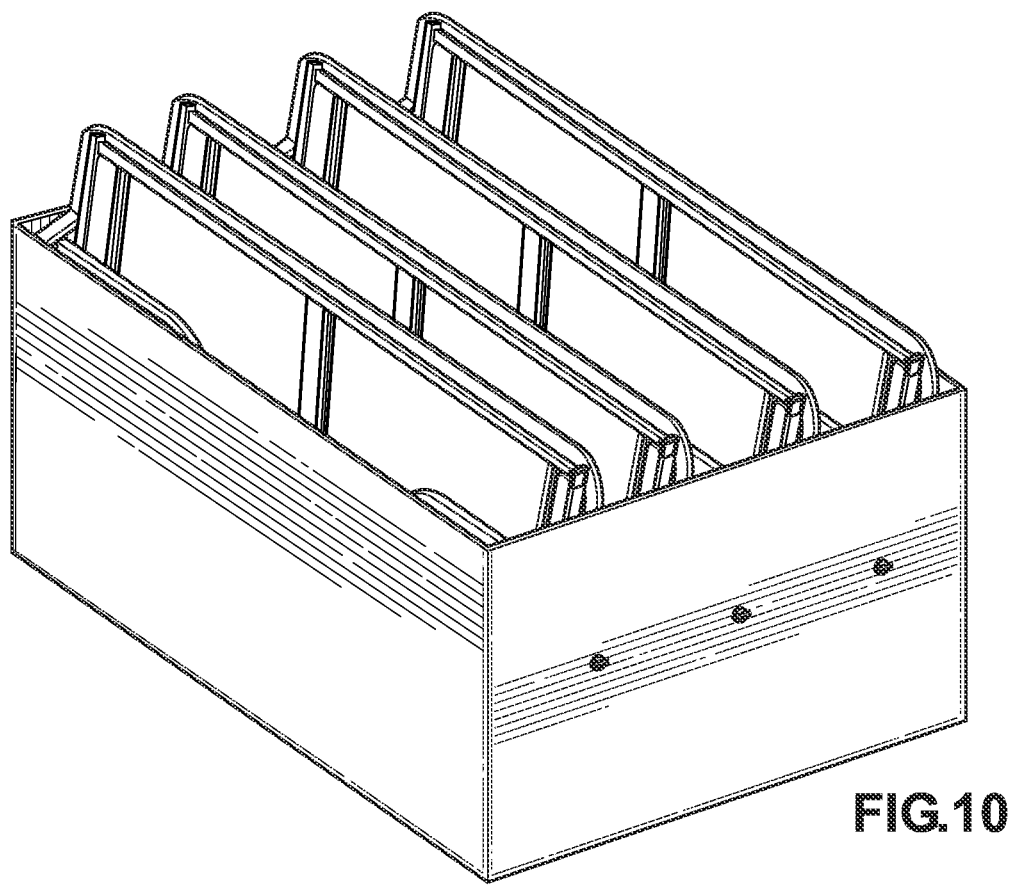
FIG. 10 shows the container of FIG. 1 loaded with foldable benches.

It will be understood that the dividers 18 will be located parallel to the end walls 16a and 16b, since the end walls serve to support the chairs 30 in the upright position. Thus, when packing the box 12, six of the chairs will be between the end wall 16a and the adjacent divider 18, then six of the chairs will be between this divider 18 and the next adjacent divider 18, then six chairs will be between this divider 18 and the end wall 16b. The thus loaded box 12 is then ready to be completed for shipping. For example, a top box 40 may be applied over the box 12, which serves as a bottom, and strapping 42 applied to secure for shipping (FIG. 8). The use of elastic straps or other elastic material for the dividers 18 is advantageous in this regard, as the elastic enables the dividers 18 to move or flex during shipment so as to avoid being broken or damaged or the like from load shifting or the like during shipping. As previously noted, only four of the chairs 30 are shown in the box 12, it being understood that the depicted box 12 is initially loaded with preferably about twenty-three (23) or twenty-four (24) of the chairs 30.

The thus loaded and secured container may then be shipped to a retail location for sale of the chairs. At this time, the box 12 may be placed on the sales floor of the retail location and the strapping 42 and top box 40 removed and disposed of. The box 12 serves as a suitable display for the chairs 30. Then, as chairs are sold, the dividers 18 serve to maintain the remaining chairs in an attractive, upright orientation, and customers do not have to bend over the box to pick up or select a chair that has fallen to the bottom of the box. The elastic nature of the dividers 18 is also desirable during display, as the flexible nature of the dividers 18 enables the divider to avoid damage such as when a customer may shift chairs during selection of a chair and cause one or more of the remaining chairs to fall on the divider.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed:

1. A shipping and display container, comprising:
    a plurality of foldable goods comprising foldable tables in an upright and folded orientation;
    a bottom box configured to receive the foldable goods in an upright and folded orientation with the goods extending above an upper edge of the bottom box, the bottom box having:
    a pair of opposed sidewalls, and
    at least two elongate dividers affixed to the bottom box and extending between the opposed sidewalls and configured so as to enable the foldable goods received in the bottom box to be stacked against one another in the upright folded orientation with groups of the foldable goods located on both sides of each of the elongate dividers to maintain the goods in the upright and folded orientation for shipping, and
    a top box installable upon the bottom box with the foldable goods received therein in the upright and folded orientation for shipping of the foldable goods, the top box removable from the bottom box after shipping,
    wherein the bottom box and the divider cooperate to maintain the foldable goods in the upright and folded orientation for display thereof after removal of the top box, and enable removal of individual ones of the foldable goods from the bottom box and maintain remaining ones of the foldable goods in the bottom box in the upright and folded orientation for display.

2. The shipping and display container according to claim 1, wherein the at least two elongate dividers each comprise an elastic strap.

3. The shipping and display container according to claim 1, further comprising mounts on each of the opposed sidewalls for connecting the at least two elongate dividers to the opposed sidewalls.

4. The shipping and display container according to claim 3, wherein the mounts are located on an exterior of each opposed sidewall.

5. The shipping and display container according to claim 1, wherein the opposed sidewalls each have apertures through which the at least two elongate dividers extend.

6. The shipping and display container according to claim 5, wherein each aperture is located adjacent to an upper end of each of the opposed sidewalls.

7. The shipping and display container according to claim 5, wherein each elongate divider is cylindrical having a diameter, and the apertures of the opposed sidewalls each have a diameter that is substantially the same as the diameter of the elongate divider.

8. The shipping and display container according to claim 1, wherein each elongate divider is perpendicular to the first sidewall and the second sidewall.

9. A shipping and display container, comprising:
    a plurality of foldable goods comprising foldable benches in an upright and folded orientation;
    a bottom box configured to receive the foldable goods in an upright and folded orientation with the goods extending above an upper edge of the bottom box, the bottom box having:

a pair of opposed sidewalls, and at least two elongate dividers affixed to the bottom box and extending between the opposed sidewalls and configured so as to enable the foldable goods received in the bottom box to be stacked against one another in the upright folded orientation with groups of the foldable goods located on both sides of each of the elongate dividers to maintain the goods in the upright and folded orientation for shipping, and a top box installable upon the bottom box with the foldable goods received therein in the upright and folded orientation for shipping of the foldable goods, the top box removable from the bottom box after shipping, wherein the bottom box and the divider cooperate to maintain the foldable goods in the upright and folded orientation for display thereof after removal of the top box, and enable removal of individual ones of the foldable goods from the bottom box and maintain remaining ones of the foldable goods in the bottom box in the upright and folded orientation for display.

10. The shipping and display container according to claim 9, wherein the at least two elongate dividers each comprise an elastic strap.

11. The shipping and display container according to claim 9, further comprising mounts on each of the opposed sidewalls for connecting the at least two elongate dividers to the opposed sidewalls.

12. The shipping and display container according to claim 11, wherein the mounts are located on an exterior of each opposed sidewall.

13. The shipping and display container according to claim 9, wherein the opposed sidewalls each have apertures through which the at least two elongate dividers extend.

14. The shipping and display container according to claim 13, wherein each aperture is located adjacent to an upper end of each of the opposed sidewalls.

15. The shipping and display container according to claim 13, wherein each elongate divider is cylindrical having a diameter, and the apertures of the opposed sidewalls each have a diameter that is substantially the same as the diameter of the elongate divider.

16. The shipping and display container according to claim 9, wherein each elongate divider is perpendicular to the first sidewall and the second sidewall.

\* \* \* \* \*